United States Patent
Tseng et al.

(10) Patent No.: US 11,822,657 B2
(45) Date of Patent: *Nov. 21, 2023

(54) MACHINE LEARNING-BASED MALWARE DETECTION SYSTEM AND METHOD

(71) Applicant: Zscaler, Inc., San Jose, CA (US)

(72) Inventors: Huihsin Tseng, Cupertino, CA (US); Hao Xu, Palo Alto, CA (US); Jian L Zhen, Palo Alto, CA (US)

(73) Assignee: Zscaler, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/724,744

(22) Filed: Apr. 20, 2022

(65) Prior Publication Data

US 2022/0245248 A1  Aug. 4, 2022

Related U.S. Application Data

(63) Continuation of application No. 17/067,854, filed on Oct. 12, 2020, now Pat. No. 11,341,242, which is a
(Continued)

(51) Int. Cl.
*G06F 21/56* (2013.01)
*G06N 20/00* (2019.01)
(Continued)

(52) U.S. Cl.
CPC .............. *G06F 21/566* (2013.01); *G06N 5/01* (2023.01); *G06N 20/00* (2019.01); *G06N 20/20* (2019.01); *G06F 2221/034* (2013.01)

(58) Field of Classification Search
CPC .......... G06F 16/24578; G06F 17/2235; G06F 3/04842; G06N 5/04; G06N 5/003;
(Continued)

(56) References Cited

U.S. PATENT DOCUMENTS 9,152,789 B2   10/2015   Natarajan et al.
2007/0233477 A1*  10/2007  Halowani ............... H03M 7/30
                                                    704/232
(Continued)

OTHER PUBLICATIONS

Jordaney, Roberto, et al. "Transcend: Detecting concept drift in malware classification models." 26th {USENIX} Security Symposium ({USENIX} Security 17). 2017.
(Continued)

*Primary Examiner* — Ashokkumar B Patel
*Assistant Examiner* — William B Jones
(74) *Attorney, Agent, or Firm* — Baratta Law PLLC; Lawrence A. Baratta, Jr.

(57) ABSTRACT

Disclosed is a computer implemented method for malware detection that analyses a file on a per packet basis. The method receives a packet of one or more packets associated a file, and converting a binary content associated with the packet into a digital representation and tokenizing plain text content associated with the packet. The method extracts one or more n-gram features, an entropy feature, and a domain
(Continued)

400 feature from the converted content of the packet and applies a trained machine learning model to the one or more features extracted from the packet. The output of the machine learning method is a probability of maliciousness associated with the received packet. If the probability of maliciousness is above a threshold value, the method determines that the file associated with the received packet is malicious.

20 Claims, 10 Drawing Sheets

Related U.S. Application Data continuation of application No. 15/946,706, filed on Apr. 5, 2018, now Pat. No. 10,817,608.

(60) Provisional application No. 62/483,102, filed on Apr. 7, 2017.

(51) Int. Cl.
*G06N 20/20* (2019.01)
*G06N 5/01* (2023.01)

(58) Field of Classification Search
CPC ..... G06N 20/00; H04L 43/08; H04L 43/1416; H04L 43/1425; H04L 63/06; G06K 9/2063

See application file for complete search history.

(56) References Cited

U.S. PATENT DOCUMENTS

| | | | |
|---|---|---|---|
| 2010/0115621 A1* | 5/2010 | Staniford | H04L 63/1416 726/25 |
| 2017/0063886 A1* | 3/2017 | Muddu | G06F 16/444 |
| 2018/0150758 A1* | 5/2018 | Niininen | H04L 41/147 |
| 2018/0191629 A1* | 7/2018 | Biederman | H04L 69/22 |
| 2018/0293381 A1 | 10/2018 | Tseng et al. | |

OTHER PUBLICATIONS

Kantchelian, Alex, J. D. Tygar, and Anthony Joseph. "Evasion and hardening of tree ensemble classifiers." International Conference on Machine Learning. 2016.

Tolomei, Gabriele, et al. "Interpretable predictions of tree-based ensembles via actionable feature tweaking." Proceedings of the 23rd ACM SIGKDD International Conference on Knowledge Discovery and Data Mining. ACM, 2017.

* cited by examiner

MACHINE LEARNING-BASED MALWARE DETECTION SYSTEM AND METHOD

CROSS REFERENCE TO RELATED APPLICATIONS

This application is a continuation of U.S. patent application Ser. No. 17/067,854 Entitled "SYSTEM AND METHOD FOR MALWARE DETECTION ON A PER PACKET BASIS," filed on Oct. 12, 2020, which is a continuation of U.S. patent application Ser. No. 15/946,706 Entitled "SYSTEM AND METHOD FOR MALWARE DETECTION ON A PER PACKET BASIS," filed on Apr. 5, 2018, now U.S. Pat. No. 10,817,608 issued on Oct. 27, 2020, which claims the benefit of U.S. Provisional Application No. 62/483,102, entitled "SYSTEM AND METHOD FOR MALWARE DETECTION ON A PER PACKET BASIS," filed on Apr. 7, 2017, each are hereby incorporated by reference in their entirety.

BACKGROUND

The present disclosure generally relates to malware detection systems and more specifically to a machine learning-based malware detection system and method that determines the maliciousness of a file on a per packet basis.

Malware, or malicious software, is software designed to disrupt the operation of, or steal information from, computer systems. Generally, typical malware detection engines maintain a database of millions of hashes of known malware. For every file the malware detection engine receives, the engine: computes a hash for the entire file; and compares the computed hash to the millions of stored malware hashes maintained in the database. If a match is found, between a hash of the complete file and one of the millions of stored hashes of known malware. The signature-based approach is designed to detect known malware, and its success rate, known as efficacy, is approximately 42% based on one well known security company's report.

Alternatively or additionally, a typical malware detection engine may store a received file in a malware sandbox. Malware sandboxes are typically virtual machines or simulated environments where an executable file can be executed, or a document file can be opened. Here, the malware sandbox is configured to monitor and observe the behaviors of these files, including system calls, remote connections, and open files in order to determine if the file performs a malicious activity. While the total efficacy of malware sandboxes can be very high, malware sandboxes can take a long time (e.g., minutes or hours) to determine whether a file is malicious or benign.

Finally, a malware detection engine may utilize machine learning to detect both known and unknown malware. This approach typically uses supervised learning methods to learn from and make predictions on a large corpus of data, such as a large number of malware samples. The typical machine learning training process collects millions of malware samples, extracts a set of features from these samples, and feeds the features into a machine learning model to determine patterns in the data. The output of this training process is a machine learning model that can predict whether a file that has not been seen before is malicious or not. In all existing implementations of machine learning-based malware detection engine, the input is a complete file.

Thus, generally, it takes approximately 15 minutes on average to detect malware according to NSSLabs report of October 2016. Accordingly, customers have a fundamental need to decrease the amount of time it takes to detect malware before it gains foothold in the infrastructure, and either causes damage, disruption, or steals information.

SUMMARY

A malware detection engine (MDE) determines a probability of maliciousness of a file by incrementally inspecting one or more packets associated with the file. Said another way, the system determines the probability of maliciousness of a file before having access to the complete file. In one embodiment, the system analyzes as little data as a size of portable executable (PE) file header while achieving similar efficacy as engines that analyze the complete file. In other embodiments, other data sizes may be analyzed. The malware detection engine reduces the time it takes to evaluate the maliciousness of a file from 15 minutes to under 10 milliseconds.

In various embodiments, the MDE determines, with high confidence, the probability that the file contains malicious content by extracting one or more features from a packet associated with the file. For example, if a probability of maliciousness associated with a packet is above a threshold value the MDE provides a recommendation to a customer to take an action. Alternatively, for example, if the MDE determines that the probability of maliciousness associated with a packet is below a threshold value, the MDE may determine that the packet is benign. In an embodiment, if the MDE determines that the packet is benign it stores the one or more features extracted from the packet and waits for a next packet associated with the file.

If the MDE cannot be certain that a packet contains malicious content, or that the packet is benign, the MDE may request a next packet and then perform the same analysis on the next packet. In various embodiments, this process is repeated until a last packet of the one or more packets associated with the file is determined to be benign.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Figure 1:
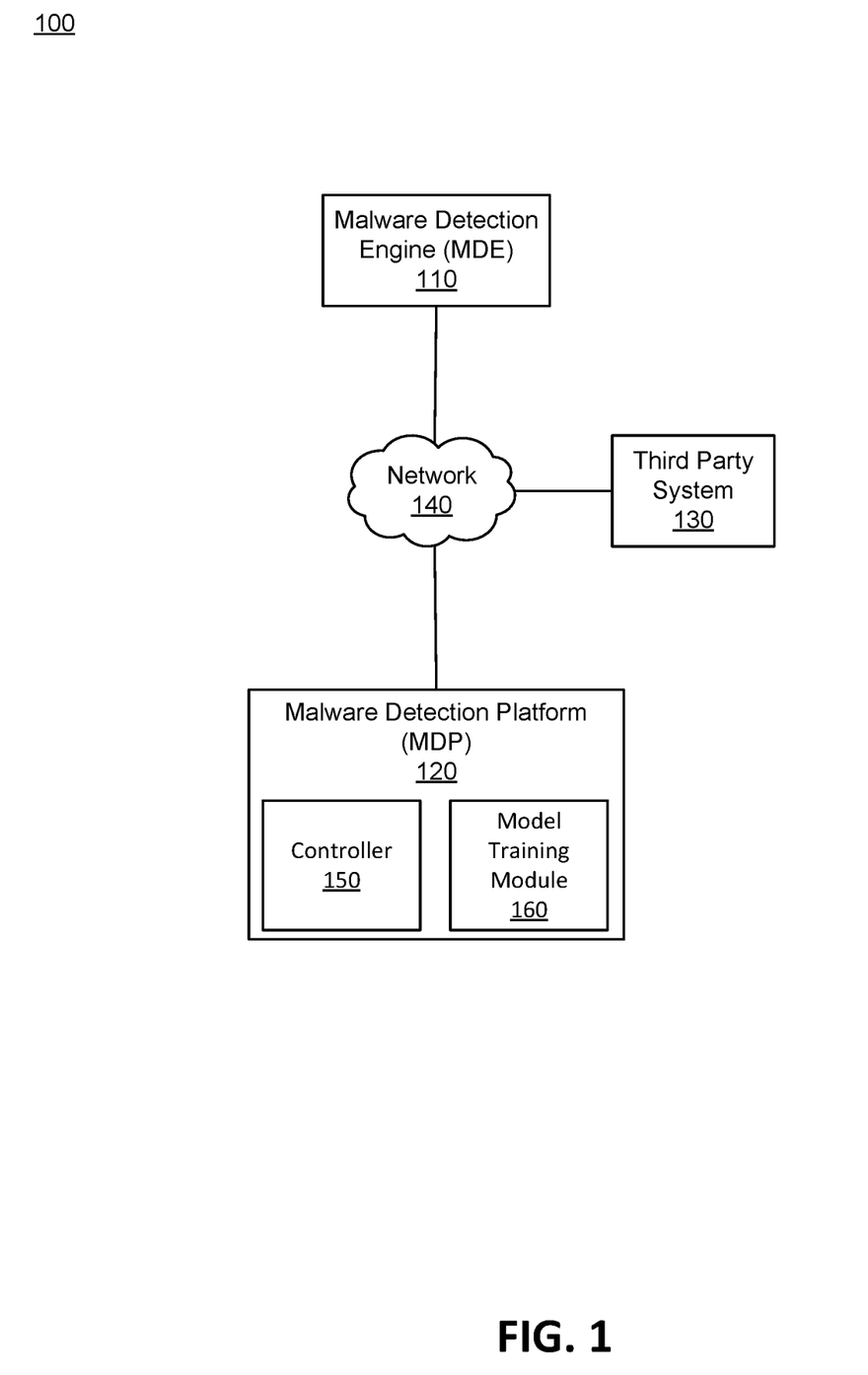
FIG. 1 is a block diagram of a system environment in which a malware detection engine (MDE) operates, in accordance with an embodiment.

FIG. 1 is a block diagram of a system environment 100 in which a malware detection engine (MDE) 110 operates, in accordance with an embodiment. The system environment 100 comprises the MDE 110, a malware detection platform (MDP) 120, a third party system 130, and a network 140. As shown by FIG. 1, the MDE 110, the MDP 120, and the third party system 130 are connected to one another via the network 140. In the system environment 100, the MDE 110 is associated with a customer (not shown). In alternative configurations, different and/or additional components may be included in the system environment 100. For example, the system environment 100 may include multiple MDEs 110 wherein each MDE 110 is connected to a different customer (not shown). In FIG. 1 a single MDE 110 is connected to the MDP 120 for the sake of clarity. The embodiments described herein can be adapted to online systems that are not MDEs 110.

The MDE 110 is configured to incrementally apply a trained machine learning model to predict a maliciousness of a file based on a per packet basis. In an embodiment, the MDE 110 includes a network packet gateway. As used herein, a gateway is a generic term that can represent a firewall, a router, a switch, a virtual switch, etc.

The MDE 110 may store a copy of a received packet including one or more features extracted from the received packet. The MDE 110 may receive a trained machine learning model from the MDP 120. The MDE 110 may store the received trained machine learning model in a store. In various embodiments, the MDE 110 receives a file from the third party system 130 via the network 140. Here, the MDE 110 is configured to incrementally receive one or more packets of a file from the third party system 130 via the network 140, identify a mime-type associated with the packet, extract a content associated with the received packet, and inspect the content of the packet. Here, inspecting a packet comprises extracting one or more features from the content associated with the packet and applying the one or more extracted features to a trained machine learning model. Examples of extracted features include one or more n-gram features, an entropy feature, and a domain feature. Extracted features are further described below.

The MDE 110 may determine a probability of maliciousness for a received packet. The probability of maliciousness is determined by applying the extracted one or more features to the trained machine learning model. In one or more embodiments, the MDE 110 may also determine that a packet is malicious or benign based on a relationship between the determined probability of maliciousness and a threshold value. For example, if a probability of maliciousness associated with the packet is above the threshold value, the MDE 110 determines that a file associated with the packet is malicious. Alternatively, for example, if the probability of maliciousness associated with the packet is below the threshold, the MDE 110 determines that the packet is benign. In an embodiment, if a packet is determined to be benign, the MDE 110 inspects a next packet of the one or more packets. In the embodiment described directly above, if all the received packets associated with the file are determined to be benign, the MDE 110 determines that the file is benign.

The MDE 110 may provide a recommendation to a customer to perform an action based on the determined probability of maliciousness of a file. Example recommendations provided by the MDE 110 include accepting the received packet, dropping the received packet, terminating a connection associated with the received packet, and/or blocking the remote host associated with the packet. The MDE 110 is further described below in conjunction with FIG. 2.

The MDE 110 may determine that the maliciousness of the packet is uncertain based on the probability of maliciousness of the packet. In an embodiment, the MDE 110 comprises a first threshold and a second threshold. Here, if the probability of maliciousness of the received packet is greater than the first threshold, the MDE 110 determines that the packet is malicious. Alternatively, if the probability of maliciousness of the received packet is less than the second threshold, the MDE 110 determines that the packet is benign and if the probability of maliciousness is greater than the second threshold and less than the first threshold, the MDE 110 determines that the received packet's maliciousness is uncertain. In various embodiments, maliciousness of a received packet is uncertain, the MDE 110 recommends accepting the packet. In an embodiment, in uncertain cases, the MDE 110 stores the received packet and one or more features extracted from the received packet. In the embodiment described above, when a next packet of the one or more packets associated with the file is received, the packet a probability of maliciousness of the next packet is determined based on the one or more features extracted from the packet and the next packet. In one or more other embodiments, the one or more extracted features are transmitted to the MDP 120 via the network 140. The MDP 120 and the network 140 are further described below.

In various embodiment, MDE 110 includes firewalls and one or more networking devices. In an embodiment, the MDE 110 has a detection rate (DR) of 95%. In one or more embodiments, the false positive (FP) rate of the MDE 110 is less than 0.1%. In the embodiments described above, the MDE 110 may process a packet in less than 10 milliseconds (ms). In still other embodiments, the FP rate and the DR of an MDE 110 are controllable via the MDP 120. The MDP 120 and the MDE 110 are both further described below.

One or more third party systems 130 may be coupled to the network 140 for communicating with the MDE 110, which is further described below in conjunction with FIG. 2. In one embodiment, a third party system 130 is an application provider communicating information describing applications for execution by a customer associated with the MDE 110. In other embodiments, a third party system 130 provides content or other information for presentation via a device associated with a customer associated with the MDE 110. A third party system 130 may also communicate information to the MDE 110, such as advertisements, content, or information about an application provided by a customer associated with the MDE 110. The controller may be configured to push a trained machine learning model to an MDE 110.

The MDE 110, the MDP 120, and the third party system 130 may be capable of transmitting and/or receiving data via the network 140. The network 140 may comprise any combination of local area and/or wide area networks, using both wired and/or wireless communication systems. In one embodiment, the network 140 uses standard communications technologies and/or protocols. For example, the network 140 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 140 include multiprotocollabel switching (MPLS), transmission control protocol/Internet protocol (TCP/IP), hypertext transport protocol (HTTP), simple mail transfer protocol (SMTP), and file transfer protocol (FTP). Data exchanged over the network 140 may be represented using any suitable format, such as hypertext markup language (HTML) or extensible markup language (XML). In some embodiments, all or some of the communication links of the network 140 may be encrypted using any suitable technique or techniques.

The MDP 120 comprises a controller 150 and a training module 160. The controller 150 may be configured to receive a selection of a FP rate from a customer associated with the MDE 110. In alternative configurations, different and/or additional components may be included in the MDP 120. For example, the controller 150 may be separate from the MDP 120. In other configurations, functionalities described herein may be distributed amount modules differently than that described herein. Conventional components such as network interfaces, security functions, load balancers, failover servers, management and network operations consoles, and the like are not shown so as to not obscure the details of the system architecture.

The controller 150 may be configured to transmit or push a trained machine learning model to a MDE 110. In various embodiments, transmitting a machine learning model to the MDE 110 comprises generating a data stream and transmitting a trained machine learning model to the MDE 110 over the generated data stream. In some embodiments, the generated data stream is encrypted. In still other embodiments, the controller 150 is configured to generate a plurality of data streams between each of one or more MDEs 110. Here, a trained machine learning model is transmitted to each of the one or more MDEs 110. In still other embodiments, the controller 150 is configured to receive feedback including one or more selection criteria from customers associated with the MDE 110. For example, the controller 150 receives a selection of a geographic area associated with the MDE 110 and a time associated with the MDE 110. The controller 150 may additionally receive a set of features associated with a packet received by the MDE 110. In various embodiments, the controller 150 stores a set of features associated with the MDE 110.

The model training module 160 is configured to train a machine learning model based on the selected FP rate, and a data for modeling. The data for modeling is selected from a set of benign files and a set of malicious files. Here, the set of benign files comprises, for example, a list of files retrieved from one or more third party sources via the network 140. Third party sources (not shown) that provide a set of set of benign files include, for example, the National Institute of Standards and Technology (NIST), National Vulnerability Database (NVD), and the Google search crawler. Third party sources that provide a set of malicious files include, for example, virustotal.com, malwr.com, and one or more malware blogs. In one or more embodiments, one or more malicious files one or more may be retrieved from a data store associated with the controller 150. In various embodiments, data for modeling is selected from the set of benign files and the set of malicious files based on one or more selection criteria. The process of selecting a set of benign and malicious files is further described below in conjunction with FIG. 5.

The model training module 160 uses supervised machine learning to train a machine learning model to determine a probability that a packet of one or more packets associated with a file is malicious. Different machine learning techniques (e.g., linear support vector machine (linear SVM), neural networks, logistic regression, nai:ve Bayes, memory-based learning, random forests, or decision trees) along with boosting algorithms (e.g., gradient boosting, AdaBoost, XGBoost) may be used in different embodiments to train a machine learning model. The trained machine learning model, when applied to a one or more features extracted from a packet, outputs a likelihood of the packet being malicious.

In one or more embodiments, the generated machine learning model is a decision tree. A trained model may include a plurality of decision trees. Each of the plurality of decision trees may include one or more nodes, one or more branches, and one or more termini. Each node in the trained decision tree represents a feature and a decision boundary for that feature. Each of the one or more termini is, in turn, associated with an output probability. Generally, each of the one or more nodes leads to another node via a branch until a terminus is reached and an output score is assigned. The trained machine learning model is further described below in conjunction with FIG. 6.

The training module 160 may be configured to validate a trained machine learning module. In various embodiments, model validation comprises determining the FP rate and a DR of a trained machine learning model. Here, the determined FP rate and the determined DR of the trained machine learning model are compared to a FP rate and the DR received by the controller 150. In an example embodiment, if the FP rate of trained machine learning model is determined to be higher than the FP rate or the DR received from MDE 110, the trained machine learning model is determined to have failed validation. In various embodiments, trained machine models that have failed validation, are retrained. Validated machine learning models are transmitted and/or pushed to a MDE 110 associated with the customer by the MDP 120 via the network 140. The process of validating a trained machine learning model is further described below in conjunction with FIG. 7.

Figure 2:
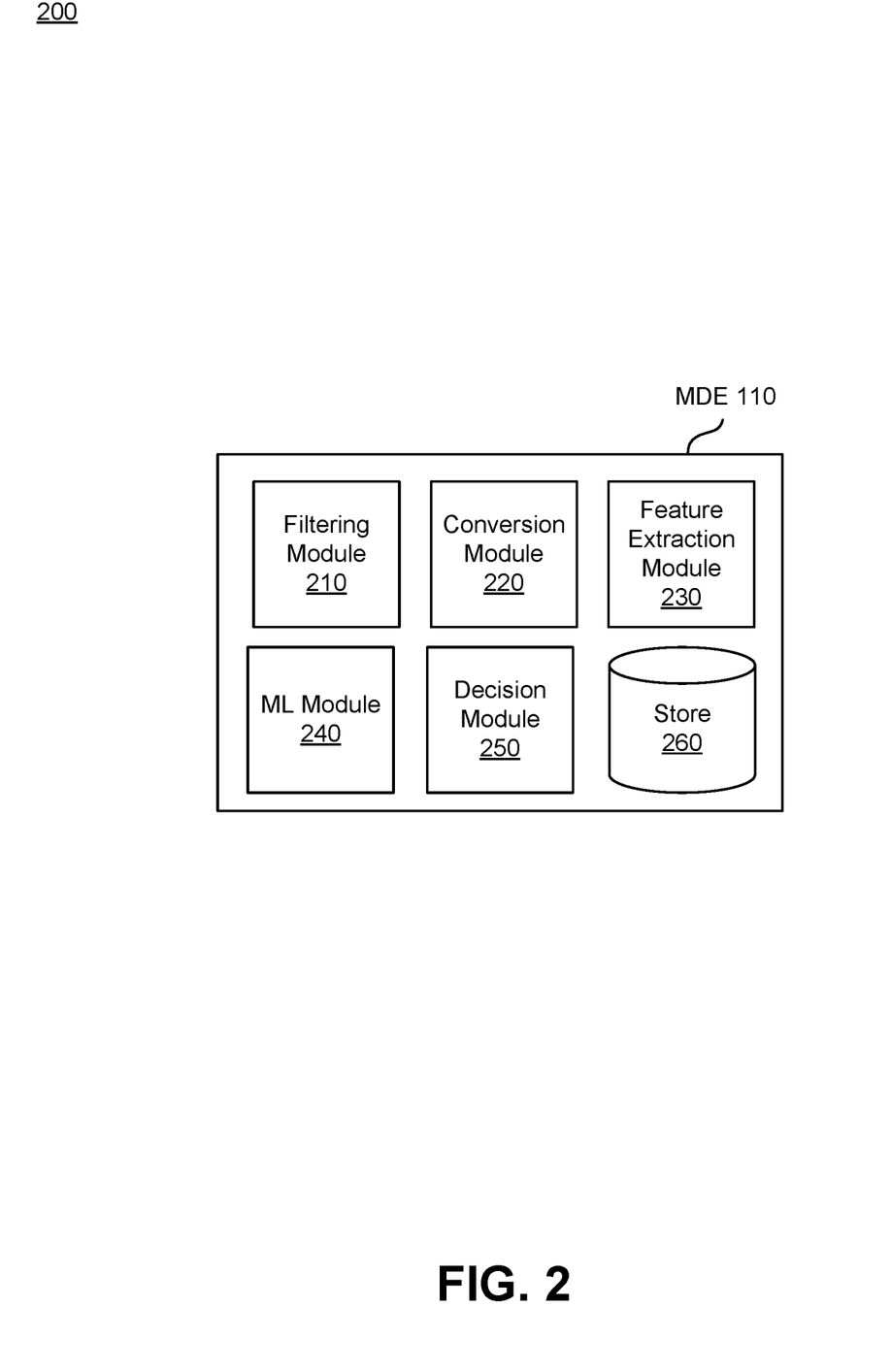
FIG. 2 is a block diagram of a MDE, in accordance with an embodiment.

FIG. 2 is a block diagram 200 of a MDE 110, in accordance with an embodiment. The MDE 110 includes a filtering module 210, a conversion module 220, a feature extraction module 230, a Machine Learning (ML) module 240, a decision module 250, and a store 260. The MDE 110 may include additional, fewer, or different components for various applications. Conventional components such as network interfaces, security functions, load balancers, failover servers, management and network operations consoles, and the like are not shown so as to not obscure the details of the system architecture.

The filtering module 210 is configured to filter an incoming packet. In various embodiments, when a packet is received by the MDE 110, the filtering module 210 determines a mime-type of a file associated with the received packet, extract the content of the packet, and transmit the extracted content to the conversion module 220. For example, if the received packet comprises a windows portable executable (PE) header, the filtering module 210 is configured to extract the content associated with the packet. In other example embodiments, the filtering module 210 determines that the packet is associated with a portable executable (PE) file, a portable document format (PDF) file, or a Microsoft Office File (e.g., Word, Excel, or PowerPoint). Here, content associated with the packet may comprise one of a binary sequence, a word sequence, or a script. The conversion module 220 is further described below.

In an embodiment, if the filtering module 210 is unable to determine a MIME-type associated with the packet, the packet is stored in a data store (e.g., the store 260). In the embodiment described above, the filtering module 210 stored the received packet (e.g., in the store 260) and waits to receive a next packet of the one or more packets associated with the file. In another embodiment, if a packet received by the MDE 110 is not a first packet associated with a file, the MDE 110 stores the received packet in a data store (e.g., store 260) until the first packet associated with the file is received. Here, once the first packet of the one or more packets is received, the filtering module 210 determines a MIME-type associated with the file associated with the received packet, extracts content associated with the packet, and transfers the content to the conversion module 220. The process performed by the filtering module 210 is further described below in conjunction with FIG. 3.

The conversion module 220 is configured to convert a binary content of a received packet into a digital representation that is useful for feature extraction by, for example, the feature extraction module 230. The feature extraction module 230 is further described below. Here examples of a digital representation include a decimal representation (base 10 representation), a Hexadecimal (base 16 representation), and a binary representation (base 2 representation). In an embodiment, the conversion module 220 converts the content associated with a received packet into decimal representation. In alternate embodiments, the conversion module 220 converts the content of a packet into hexadecimal representation, or a binary representation. For example, the converted packet is transmitted to the feature extraction module 230. Examples of a converted packet is further described, below, in conjunction with FIGS. 4A and 4B.

The conversion module 220 may extract scripts from packets associated with a PDF or other Microsoft Office document. For example, the conversion module 220 extracts JavaScript (JS) and/or Visual Basic for Applications (VBA) scripts from a packet. In embodiments, where the packet contains a JS or a VBA script, the extracted script is tokenized. The conversion module 220 may transmit the tokenized script to the feature extraction module 230.

The feature extraction module 230 extracts one or more features from a converted packet, tokenized script, and tokenized domain. At least one of the one or more extracted features may be an n-gram feature. Generally, an n-gram is a contiguous sequence of n items from a converted packet. Here, an extracted n-gram feature is related to the probability of particular sequence in a converted packet. In an embodiment, the feature extraction module 230 extracts, for example, n=1 or n=2. In an example embodiment in which a received packet is converted to a binary sequence comprising x bytes by the conversion module 220, the feature extraction module 230 extracts N n-grams (n=1) where N=x. Here, the probability, p(x), associated with a received packet is equal to a number of x in a packet divided by the number of bytes in the packet. That the number of n-gram features scales linearly with the number of bytes in a packet when the feature extraction module 230 extracts n-grams (n=1). For example, if a packet comprises 256 bytes, the feature extraction module 230 is configured to extract 256 features from the packet. In other embodiments, the feature extraction module 230 extracts n-grams of size 2 (n=2) from a received packet. Here, the feature extraction module 230 is configured to extract 65, 536 features. That is, when the feature extraction module 230 is configured to extract n-grams (n=2) from a received packet, the number of n-gram features extracted scales linearly with a square of the number of bytes in the packet. In still other embodiments, the feature extraction module 230 is configured to extract n-grams of size x. An illustrative process for extracting probability features from a converted packet is described below in conjunction with FIG. 4A.

The feature extraction module 230 may additionally, or alternatively, extract an entropy feature from a converted packet. Generally, an entropy feature associated with a converted packet is associated with a measure of the expectation of information associated with the converted packet. In an embodiment, the feature extraction module 230 determines a Shannon Entropy of a converted packet. For example, the Shannon entropy, H, of a converted packet is—$\Sigma p(x)\log(p(x))$. An illustrative process for extracting an entropy feature from a converted packet is described below in conjunction with FIG. 4B.

The feature extraction module 230 may extract a domain feature from a received packet. In an embodiment, extracting a domain feature from a received packet comprises determining the source uniform resource locator (URL) of a packet, extracting a host name (e.g., a subdomain, a domain, and a top level domain), and applying a domain model to determine if the packet is malicious or benign. For example, the feature extraction module 230 extracts one or more URLs from a content associated with a packet received from an third party system (e.g., third party system 130). In an embodiment, the feature extraction module 230 determines a probability of the one or more source URLs being seen in a malicious file. In various embodiments, the feature extraction module 230 determines both a probability of the one or more source URLs being seen in a malicious file and a probability of the one or more source URLs being seen in a benign file. In an embodiment, a process of determining the probability of the one or more source URLs being found in a benign file or a malicious file comprises extracting a host name associated with each of the one or more source URLs and applying a domain model to the extracted host names.

In various embodiments, applying a domain model to a source URL comprises tokenizing one or more source URLs associated with the packet, extracting one or more n-gram features based on the tokenized URL, and determining a probability of the URL as being malicious. For example, the feature extraction module 230 extracts the source URL "banc0esta.est.es" from a packet and tokenizes the source URL as "banc.esta," "est," and "es." Here, the maximum probability of the domain in a malicious file is the tokenized source URL. In various embodiments, features extracted from the tokenized source URL are stored in the store 260.

The feature extraction module 230 may extract one or more features from a script or domain associated with a received packet. For example, an extracted script comprising the phase "PBin=ATTH+STT2+CDDD" extracted from a received packet is tokenized into four tokens (e.g., "PBin," "ATTH," "STT2," and "CDDD"). The feature extraction module 230 extracts one or more n-gram from the tokenized script. Here, probabilities of each of the one or more n-grams extracted from the tokenized script is a feature. An illustrative process for extracting one or more features from a converted packet is described below in conjunction with FIG. 4C.

In one embodiment, the ML module 240 employs a random forest model to determine a probability of maliciousness associated with a received packet. In various embodiments, inputs to the Machine learning model include one or more features extracted from a received packet (e.g., domain features, entropy features, and n-gram features). An output of the Machine learning model is a probability of maliciousness associated with the received packet. The ML module 240 determines a probability by applying the one or more extracted features to a trained Machine learning model. In various embodiments, the random forest model is a random forest model comprising a plurality of decision trees. The plurality of decision trees may be received from a model trainer (e.g., MDP 120) based on a FP rate selected by a customer and one or more selection criteria. For example, the ML module 240 comprises N trained decision trees. A probability of maliciousness associated with a received packet as determined by the ML module 240 is equal to the summation of a probability of maliciousness determined by each of N trees divided by the number of decision trees in the random forest model. A random forest model used predict a probability of maliciousness by the ML module 240 is further described below in conjunction with FIG. 6.

The decision module 250 determines that the packet is malicious or benign. In various embodiments, the decision module 250 includes a threshold. In an embodiment, if the packet is above the threshold the decision module 250 determines that the received packet is malicious. For example, if the threshold is 0.7, and a probability of maliciousness associated with a received packet is greater than 0.7, the decision module 250 determines that a file associated with the received packet is malicious. Alternatively, in the example above, if the determined probability of maliciousness is less than 0.7, the decision module 250 determines that the packet is benign. In other embodiments, the decision module includes a first threshold and a second threshold. Here, if the probability of maliciousness associated with a received packet is above the second threshold, the decision module 250 determines that a file associated with the packet is malicious. Similarly, in the example above, if the probability of maliciousness is below the first threshold, the decision module 250 determines that the received packet is benign; and if the probability of maliciousness of a received packet greater than the first threshold and less than the second threshold, the decision module 250 determines that the maliciousness of the file associated with the received packet is uncertain.

The decision module 250 may provide a recommendation to a customer to take an action based on a determined probability. For example, the decision module 250 may provide a recommendation to a customer to, for example, drop a file associated with the received packet, terminate the connection, and/or block the remote host associated with the received packet.

Figure 3:
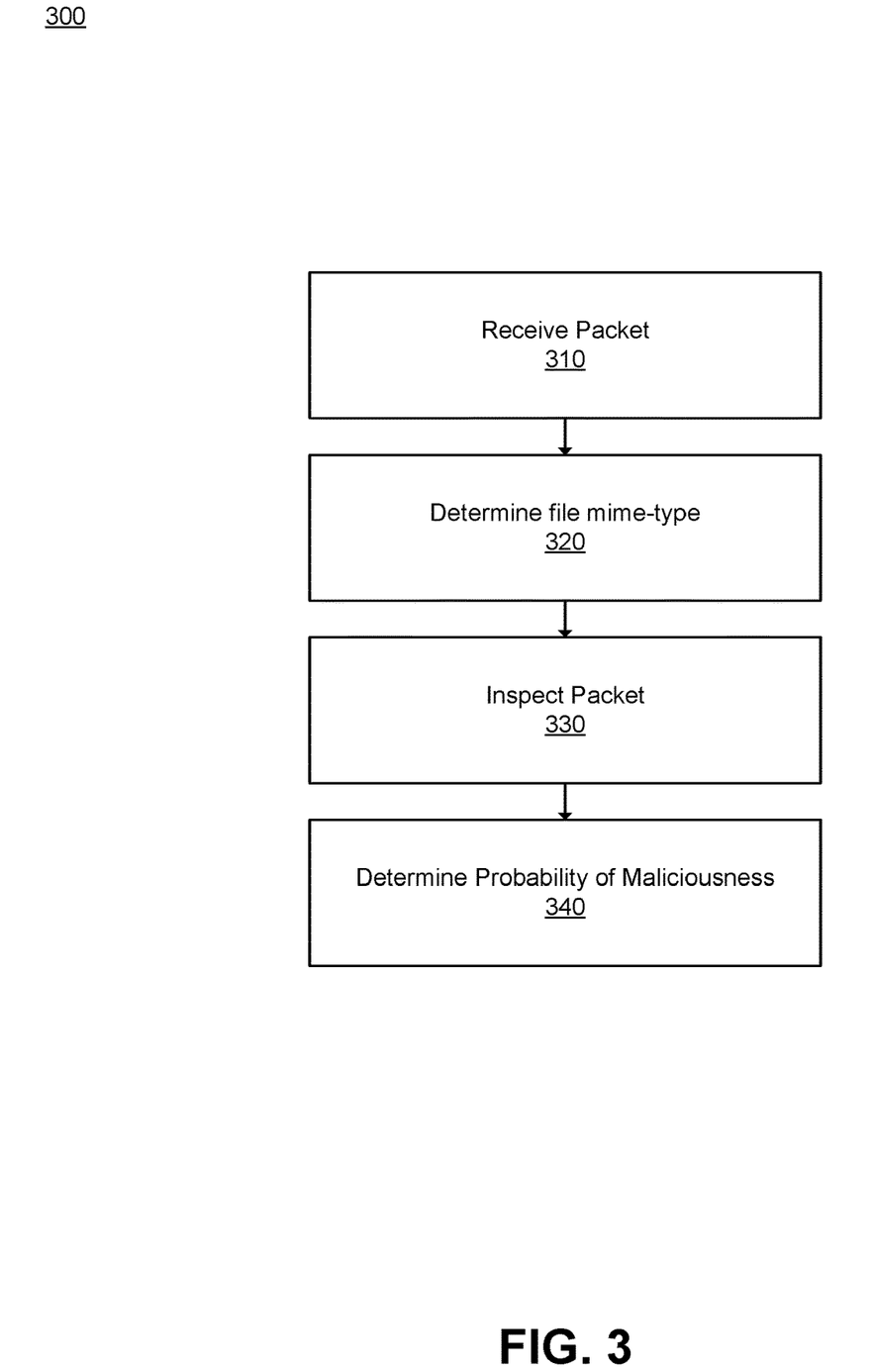
FIG. 3 is a process flow diagram for filtering a received packet, in accordance with an embodiment.

FIG. 3 is a process flow diagram 300 for filtering a received packet, in accordance with an embodiment. The process 300 illustrated in conjunction with FIG. 3 may be performed by the MDE 110. In other embodiments, the process 400 may be performed by different and or additional modules.

The MDE 110 receives 310 a packet associated with a file. In one or more embodiments, the packet is received by a filtering module 210 as described above in conjunction with FIG. 2. In one or more embodiments, the filtering module 210 determines 320 a file mime—file type associated with the file associated with the received 310 packet.

The MDE 110 inspects 330 the packet to extract the content associated with packet. In one or more embodiments, inspecting 330 a packet comprises converting the content of the packet in a binary sequence. Here, converting the extracted content associated with a received packet is described above in conjunction with FIG. 2. In other embodiments, the feature extraction module 230 extracts one or more n-gram features and/or an entropy feature associated with the content associated with the packet. Extracting features from the received packet is described above in conjunction with FIG. 2. In still other embodiments, inspecting 330 the packet further includes applying the extracted one or more features to a trained machine learning model. The trained machine learning model is further described below in conjunction with FIG. 6.

The MDE 110 determines 340 a probability of maliciousness associated with the packet In an embodiment, the ML module 240 applies a trained Machine learning model to the extracted one or more features in order to determine 340 a probably of maliciousness associated with the received packet. Here, a received packet may be determined 340 to be malicious if a probability of maliciousness associated with the packet is above a threshold. In other embodiment the MDE 110 may additionally recommend an action based on the determined probability of maliciousness. Determining 340 a probability of maliciousness associated with a received packet is further described herein.

Figure 4A:
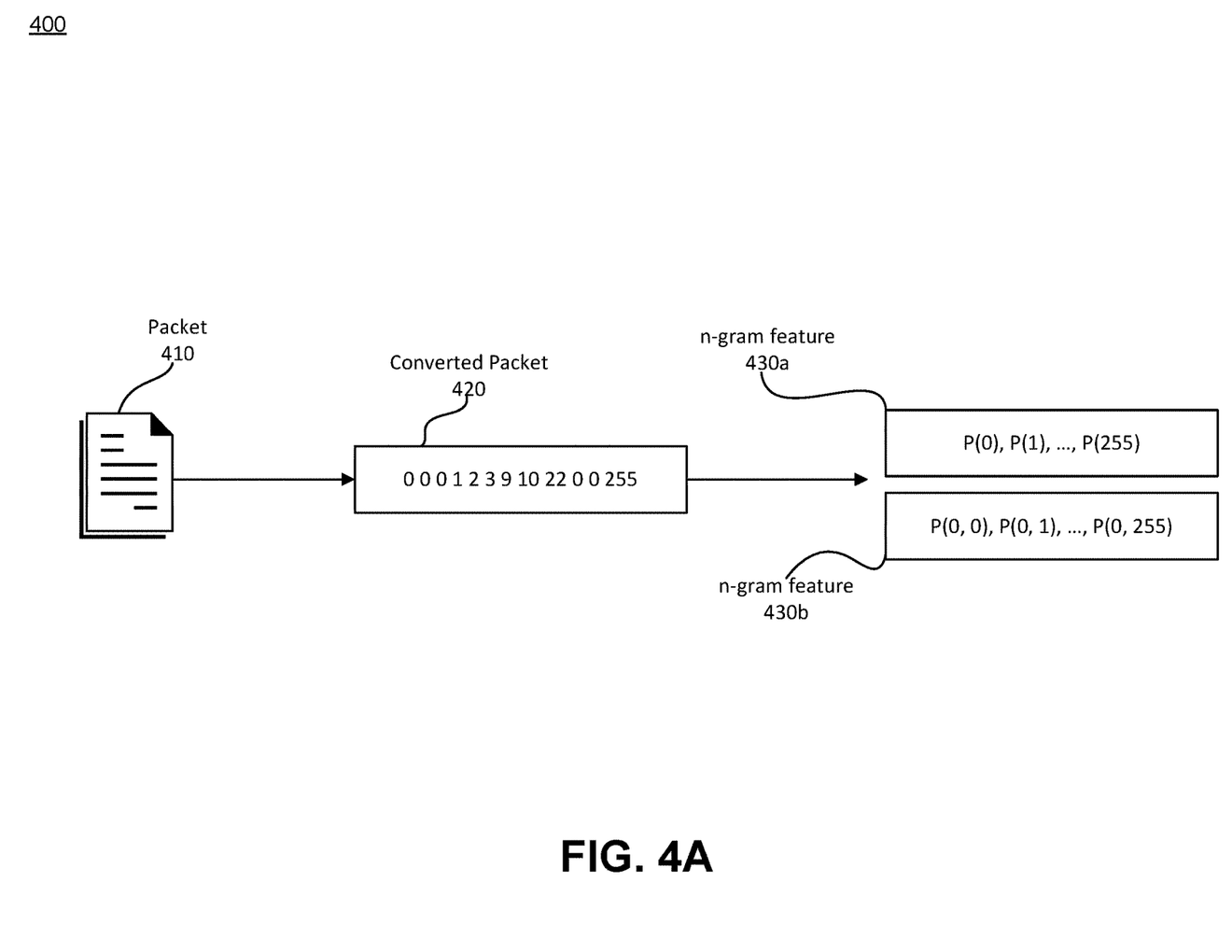
FIG. 4A illustrates a process for extracting n-gram features from a received packet, in accordance with an embodiment.

FIG. 4A illustrates a process 400 for extracting n-gram features from a received packet, in accordance with an embodiment. In one or more embodiments, the process 400 is performed by the MDE 110. FIG. 4A comprises a packet 410, a converted packet 420, one or more n-gram features 430a, and one or more n-gram features 430b. The process 400 illustrated in conjunction with FIG. 4A illustrates the steps of receiving a packet 410 associated with a file and converting the received packet 410 into a converted packet 420. In the embodiment, illustrated in conjunction with FIG. 4A, the converted packet 420 is a decimal representation of length 12 bytes. In other embodiments, the packet 410 additional or fewer bytes than those depicted in conjunction with FIG. 4A. Converting a packet is described above in conjunction with FIG. 2.

The one or more n-gram features 430a are extracted from the converted packet 420. Each of the one or more n-gram features 430a is a probability of an n-gram (n=1) in the one or more extracted n-grams (n=1). In FIG. 4A, for example, in packets, the n-gram features 430a comprises P(0)=0.42, P(1)=0.08, . . . , P(255)=0.08. The MDE 110 may additionally or alternatively determine a probability of an n-gram 430b of size 2. In FIG. 4A, for example, the probability of an individual non-repeating n-gram of the one or more n-gram features 430b is approximately 0.007. Extracting one or more n-grams 430a and 430b from a converted packet 420 is described above in conjunction with FIG. 2. In various embodiments, the extracted n-gram features are inputs to the trained Machine learning model as described above in conjunction with FIG. 2.

Figure 4B:
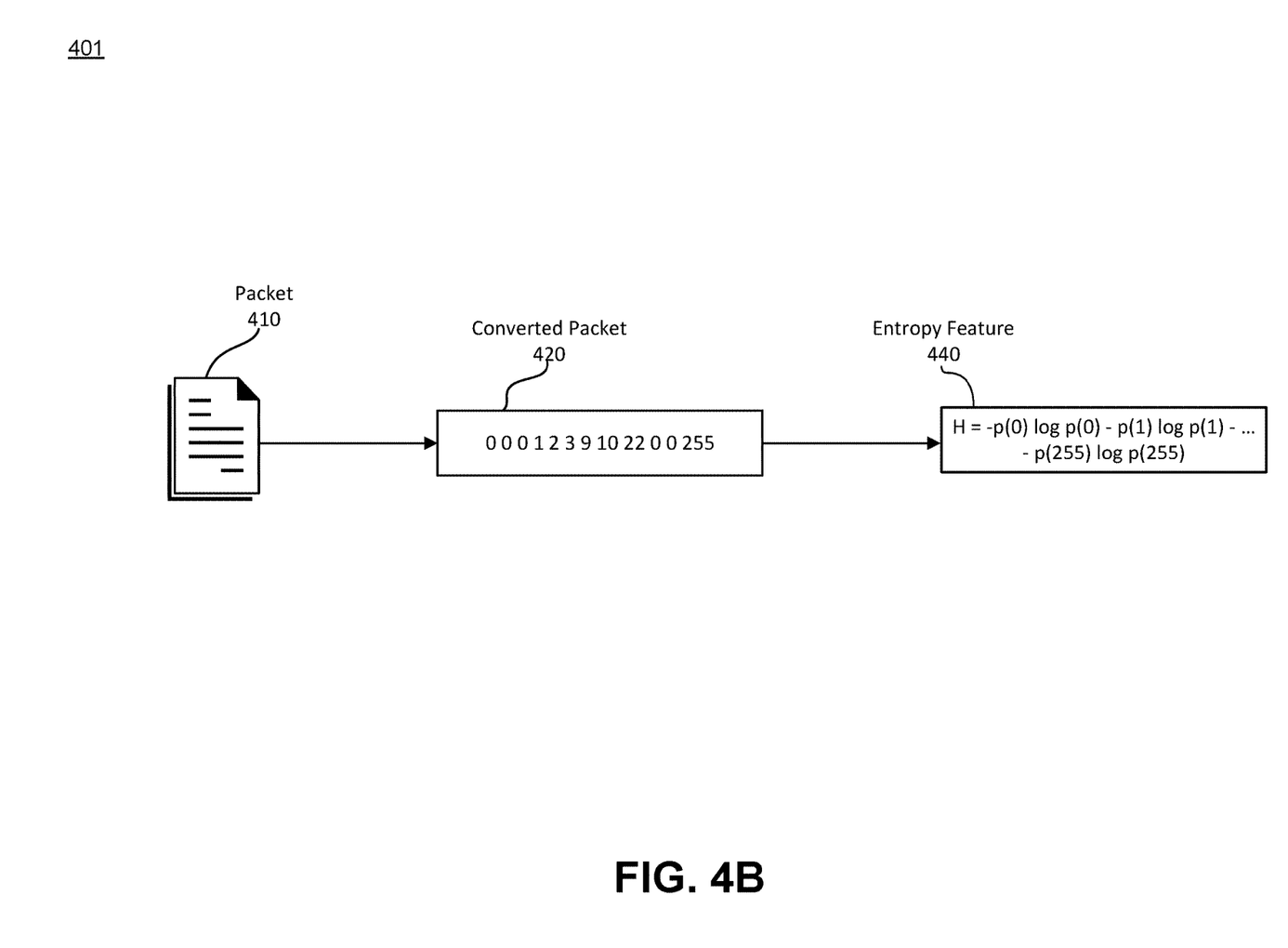
FIG. 4B illustrates a process for extracting entropy features from a received packet, in accordance with an embodiment.

FIG. 4B illustrates a process 401 for extracting entropy features from a received packet, in accordance with an embodiment. In one or more embodiments, the process 401 is performed by the MDE 110 as described above in conjunction with FIGS. 1 and 2. FIG. 4B comprises the packet 410, the converted packet 420, and an entropy feature 440. In an embodiment, the entropy feature 440 is the Shannon Entropy of the converted packet 420. Extracting an entropy feature 440 from a converted packet 420 is described above in conjunction with FIG. 2. In various embodiments, the extracted entropy feature is an input to the trained Machine learning model as described above in conjunction with FIG. 2.

Figure 4C:
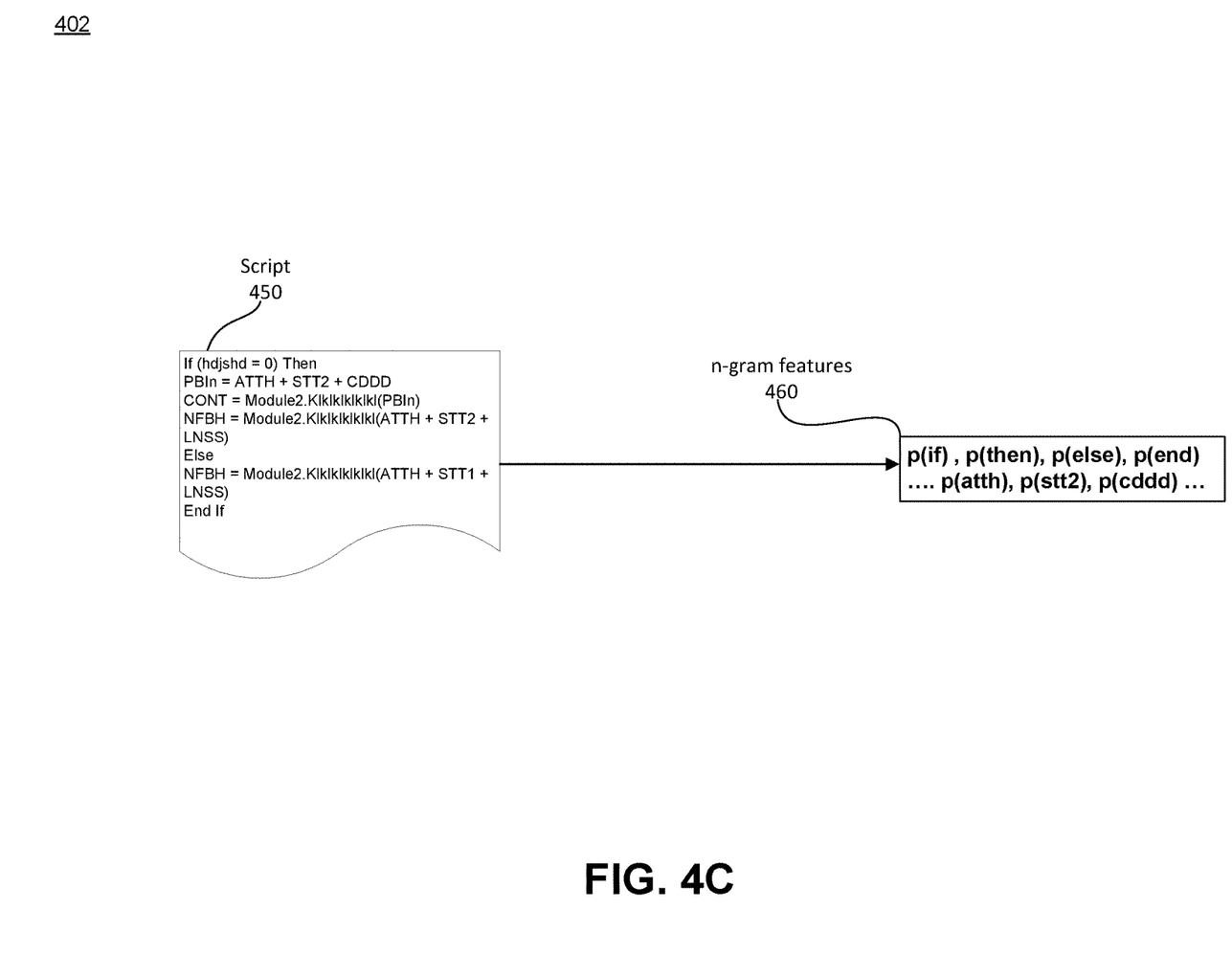
FIG. 4C illustrates a process for extracting one or more n-gram features from a script associated with a received file, in accordance with an embodiment.

FIG. 4C illustrates a process 402 for extracting one or more n-gram features 460 from a script 450 associated with a received file, in accordance with an embodiment. The process 402 may be performed by the MDE 110 and comprises the script 450 associated with a document (e.g., PDF or Microsoft Office Document) and the one or more n-gram features 460. Each of the one or more n-gram features 460 is a probability of an n-gram extracted from the script 450. For example, in FIG. 4C the one or more n-grams are "if," "then," "else," "end," "atth," "stt2," and "cddd." Extracting one or more n-gram features from a script 450 associated with a received packet is further described above in conjunction with FIG. 2.

Figure 5:
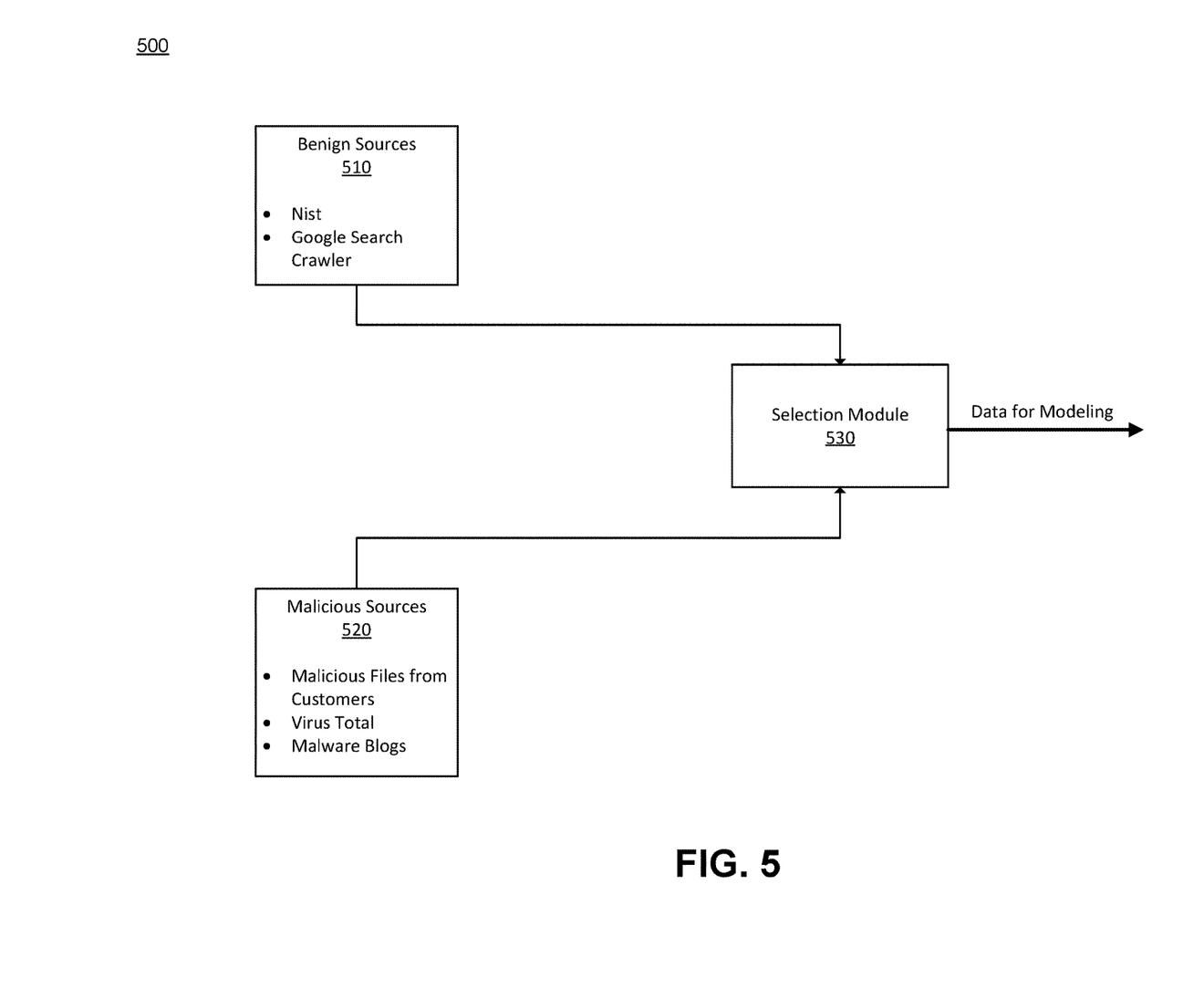
FIG. 5 illustrates a data collection process for a machine learning model, in accordance with an embodiment.

FIG. 5 illustrates a data collection process 500 for a machine learning model, in accordance with an embodiment. The data collection process 500 comprises a benign source 510 and a malicious source 520. Here, the benign source 510 comprises a set of benign files and the malicious source 520 comprises a set of malicious files. Both the set of malicious files and the set of benign files include one or more PE files, Dynamic Loaded Libraries (DLLs), Microsoft Office Documents, Adobe PDF files, HTML files, JavaScript files, Java Archive (JAR) files, etc. Sources of benign files 510 include one or more benign sources 510. Example benign sources 510 include NIST, Google, and others. Example sources of malicious files 520 include virustotal.com, malwr.com. In some embodiments, sources of benign and malicious files include previously analyzed files at an MDE 110 associated with a customer. Both the benign sources 510 and the malicious sources 520 may also include metadata associated with a set of benign files and a set of malicious files. For example, virustotal.com provides information such as the number of antivirus engines that have considered the file malicious, a data collection time, a file type, and a hash associated with the file (e.g., MD5 and SHA256).

The selection module 530 may select one or more benign files from the benign source 510 and one or more malicious files from the malicious source 520 based on one or more selection criteria. In an embodiment, the one or more selection criteria include customer relevance, freshness (e.g., recentness) of the data, and credibility of data. In other embodiment, selection criteria may also include a date, a geographic location, and a reputations of the source. Selection criteria are described above in conjunction with FIGS. 1 and 2.

The malicious source 520 and the benign source 510 are inputs to a selection module 530. In various embodiments, the selection module 530 provides data for modeling to a model trainer (e.g., model trainer 120). In other embodiments, the selection module 530 retrieves one or more files from the malicious source 520 and the benign 510 periodically. For example, the selection module 530 may retrieve one or more files from the benign source 510 and the malicious source 520 on a monthly basis, weekly basis, or daily basis. In various embodiment, retrieving data from a malicious source 520 and a benign source 510 comprises using a web crawler.

Figure 6:
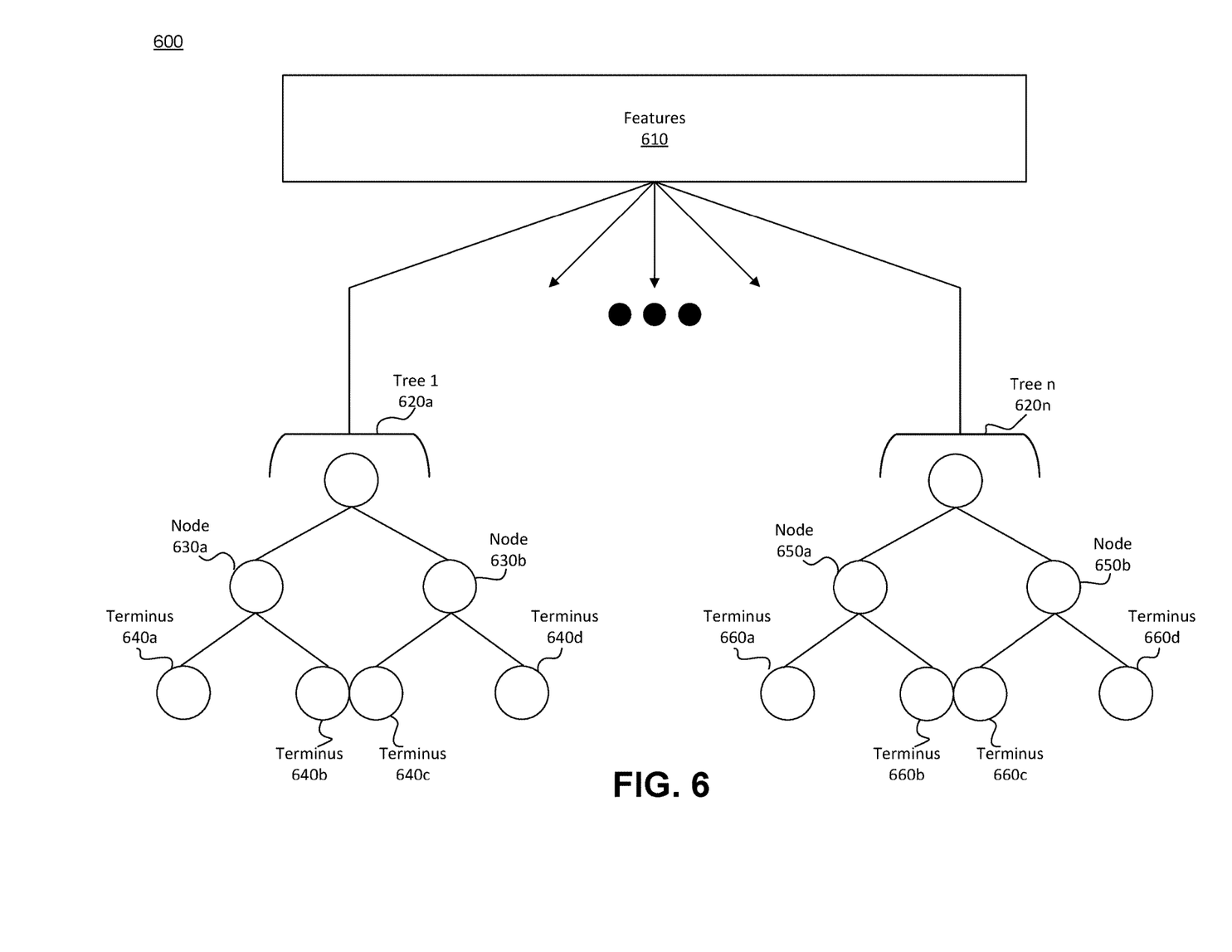
FIG. 6 illustrates a trained machine learning model, in accordance with an embodiment.

FIG. 6 illustrates a trained machine learning model 600, in accordance with an embodiment. The machine learning model 600 comprises one or more features 610, a tree 610*a*, and a tree 610*n*. The tree 610*a* and the tree 610*n* are decision trees associated with a random forest or a random decision forest ML model. In various embodiments, the trees 610*a* and 610*n* are constructed during training and received from a MDP (e.g., MDP 120). While the ML model 600 in FIG. 6 is only depicted as having trees 620*a* and tree 620*n*, in other embodiments the machine learning model 600 includes a plurality of additional trees. The features 610 may include one or more n-gram features, a domain feature, and an entropy feature that are described above in conjunction with FIGS. 2, 4A-C.

The tree 620*a* includes nodes 630*a* and 630*b* and termini 640*a*, 640*b*, 640*c*, and 640*d*. That is, the node 630*a* is connected to termini 640*a* and 640*b* and node 630*b* is connected to termini 640*c* and 640*d* via one or more branches. The tree 620*n* includes nodes 650*a* and 650*b* and termini 660*a*, 660*b*, 660*c*, and 660*d*. That is, the node 650*a* is connected to termini 660*a* and 660*b* and node 650*b* is connected to termini 660*c* and 660*d* via one or more branches. In other embodiments, the trees 620*a* and 620*n* include one or more additional nodes, one or more additional branches, and one or more additional termini. In FIG. 6, the nodes 630*a-b* and the nodes 650*a-b* each represents a feature and a decision boundary for that feature. The termini 640*a-d* and the termini 660*a-d* are each associated with a probability of maliciousness. Generally, each of the one or more nodes leads to another node via a branch until a terminus is reached and a probability of maliciousness is assigned. The output of the trained ML model 600 is an average of a probability of maliciousness predicted by each of the trees 620*a* and the tree 620*n*.

In an example embodiment in which packet is converted into a decimal representation comprising the decimal sequences=[1, 9], the probability of n-gram features (n=1) P(I) in packets is equal to 0.5 and P(9) is equal to 0.7. Here, the n-gram features extracted from the converted packet are applied to the trained ML model illustrated in FIG. 6. In an example embodiment, the tree 620*a* determines that a probability of maliciousness of the extracted n-gram features is 0.8 and tree 620*b* determines that a probability of maliciousness of the extracted n-gram features is 0.8. Accordingly, the output of the machine learning model illustrated in FIG. 6 generates a probability of maliciousness of 0.8. Generally, a probability that the packet is benign is equal to 1-probability of maliciousness. That is, in the example embodiment described directly above, the ML model determines that a probability that the received packet is benign is 0.2.

Figure 7:
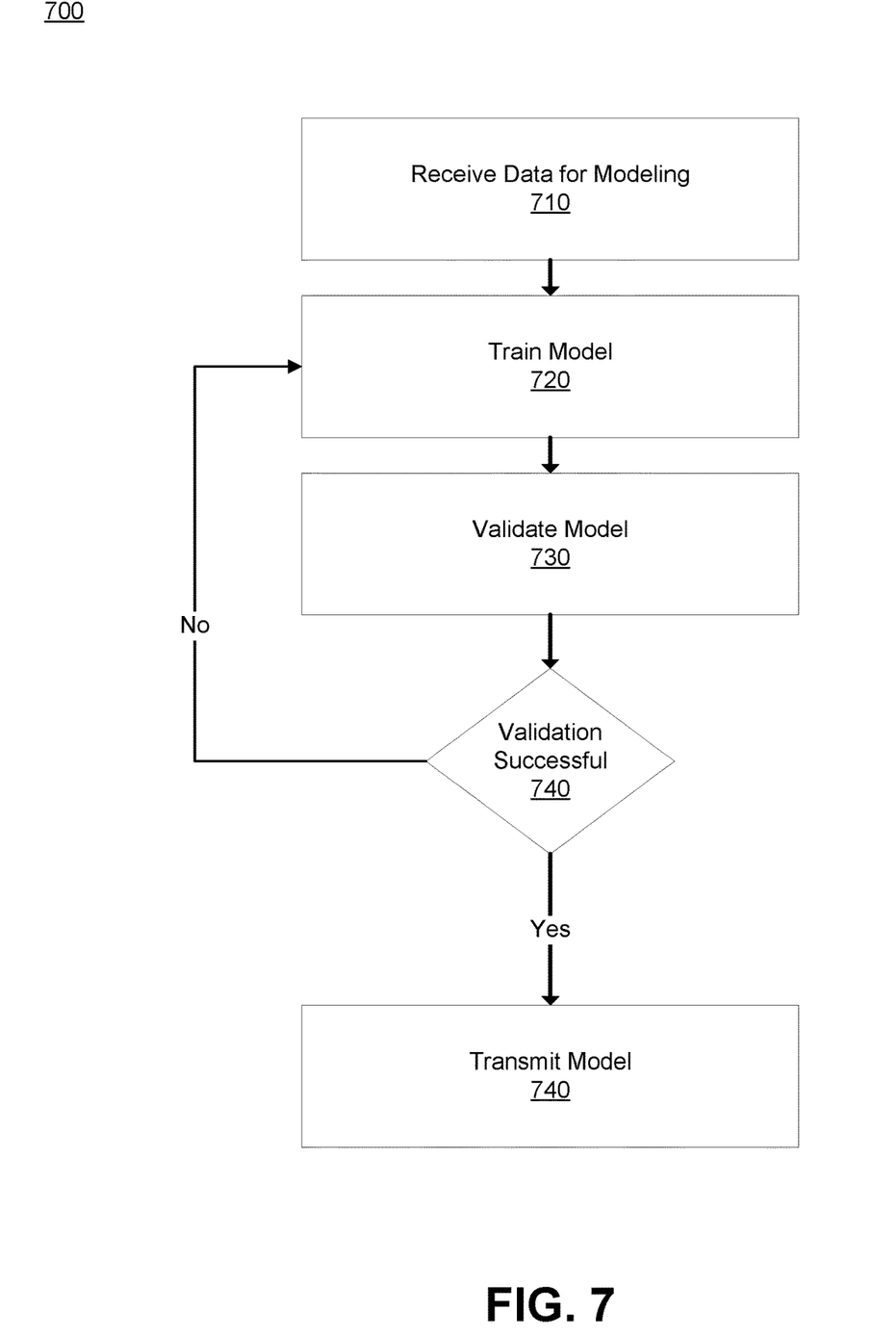
FIG. 7 is a process for validating a trained machine learning model, in accordance with an embodiment.

FIG. 7 is a process 700 for validating a trained machine learning model, in accordance with an embodiment. The process 700 receives 710 data for modeling. Here data for modeling includes one or more n-gram features, entropy features, and a domain feature associated with a packet. In various embodiments, data for modeling is received from one or more benign sources and one or more malicious sources. These sources are selected for modeling by the MDE 110 as described above in conjunction with FIGS. 2 and 5. The received 710 data for modeling is used to train 720 a machine learning model.

The training module 160 validates 730 the trained 720 machine learning model. In one or more embodiments, the trained 720 machine learning model is validated 730 based on a selected FP rate. Validating 720 a trained machine learning model is further described above in conjunction with FIG. 1. If a FP rate associated with the trained machine learning model is less than a selected FP rate, the MDP 120 determines 740 that the trained machine learning model is validated. Alternatively, if the FP rate associated with the trained machine learning model is greater than the selected FP rate, the MDP 120 determines 740 that the trained machine learning model has failed validation.

If the trained machine learning model is validated 740, the validated machine learning model is capable of being transmitted 740 to a MDE 110. Transmitting 720 a validated machine learning model is further described above in conjunction with FIG. 1. Alternatively, if the trained machine learning model is determined 740 to have failed validation, the trained machine learning model is trained 720 again by the MDP 120. Retraining a machine learning model is further described above in conjunction with FIG.

Figure 8:
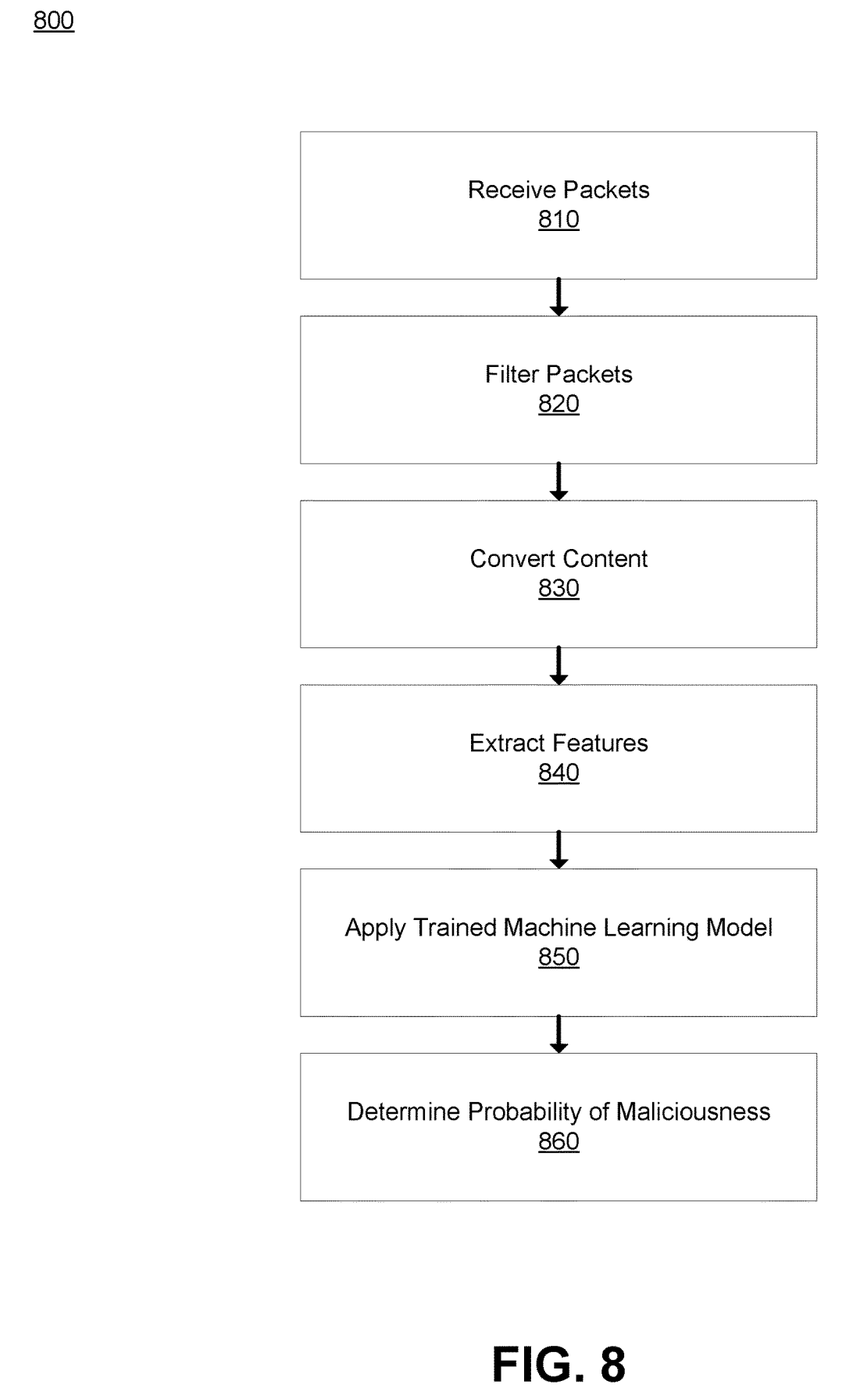
FIG. 8 is a process flow diagram for determining a probability of maliciousness associated with a received packet, in accordance with an embodiment.

FIG. 8 is a process 800 flow diagram for determining a probability of maliciousness associated with a received packet, in accordance with an embodiment. A MDE 120 incrementally receives 810 a first packet of one or more packets associated with a file. In one or more embodiments a filtering module 210, 820 determines a mime-type associated with the first packet. In other embodiments, the filtering module 210 may additionally be configured to extract a content associated with the first packet. The filtering module 210 is further described above in conjunction with FIGS. 2 and 3.

The conversion module 220 converts 830 the extracted contents into a corresponding digital representation that is useful for feature extraction. As further described, above, in conjunction with FIG. 2, converting 830 a packet comprises determining a decimal representation, binary representation, or a hexadecimal representation, for example, of the contents of the first packet. In some embodiments, the conversion module 220 additionally or alternatively converts 830 a received packet into a tokenized script or a tokenized domain.

The feature extraction module 230 extracts 840 one or more features from the converted packet. Here, the feature extraction module 230 may extract 830 one or more n-gram features, an entropy feature, and a domain feature from the received packet. The feature extraction module is further described above in conjunction with FIGS. 2, 4A-C.

The ML module 240 applies 850 a trained machine learning model to the one or more extracted features to determine 860 probability of maliciousness. In various embodiments, the trained machine learning model comprises one or more decision trees. Here, the output of a tree of the one or more trees is a probability of maliciousness and the output of the trained machine learning model is probability of maliciousness of the received packet. If a probability of maliciousness of a packet associated with a file is determined 860 to be above a threshold, the file is labeled malicious and further analysis is stopped. Alternatively, if a probability of maliciousness is determined 860 to be below a threshold, the packet is determined to be benign. In these embodiments, the MDE 110 waits to receive a next packet of the one or more packets associated with a file. Determining a probability of maliciousness is further described above in conjunction with FIGS. 2 and 6.

Responsive to the determined 860 probability of maliciousness a decision module 250 may determine that the file associated with the packet comprises malicious content. In various embodiments, the decision module 250 may provide a recommendation to a customer to take an action based on the determined 860 probability of maliciousness. The decision module 250 is further described above in conjunction with FIG. 2.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A computer program product embodied in a non-transitory computer readable storage medium and comprising computer instructions that when executed by a processor cause the processor to perform steps of:
  receiving a first packet of one or more packets associated with a file;
  determining a file type of the file from the first packet;
  converting contents of the first packet into a corresponding digital representation for feature extraction;

extracting one or more features from the corresponding digital representation; and applying a trained machine learning model to the one or more features to determine probability of maliciousness.

2. The computer program product embodied in a non-transitory computer readable storage medium of claim 1, wherein the steps further include labeling the file based on the probability of maliciousness.

3. The computer program product embodied in a non-transitory computer readable storage medium of claim 1, wherein the steps further include responsive to the first packet having the probability of maliciousness as benign, receiving a next packet of the one or more packets; and performing the converting, extracting, and applying on the next packet.

4. The computer program product embodied in a non-transitory computer readable storage medium of claim 3, wherein the steps further include continuing with additional packets of the one or more packets until a determination of whether the file is malicious or benign.

5. The computer program product embodied in a non-transitory computer readable storage medium of claim 1, wherein the file type is one of a portable executable (PE) file, a portable document format (PDF) file, a Dynamic Loaded Library (DLL), a JavaScript (JS) file, a Hypertext Markup Language (HTML) file, and a Microsoft Office File.

6. The computer program product embodied in a non-transitory computer readable storage medium of claim 1, wherein the digital representation is any of a decimal representation, a binary representation, a hexadecimal representation, a tokenized script, and a tokenized domain.

7. The computer program product embodied in a non-transitory computer readable storage medium of claim 1, wherein the trained machine learning model comprises one or more decision trees.

8. The computer program product embodied in a non-transitory computer readable storage medium of claim 1, wherein the one or more features include n-gram features.

9. The computer program product embodied in a non-transitory computer readable storage medium of claim 1, wherein the one or more features include an entropy feature.

10. The computer program product embodied in a non-transitory computer readable storage medium of claim 1, wherein the one or more features include a domain feature.

11. A method comprising steps of:

receiving a first packet of one or more packets associated with a file;

determining a file type of the file from the first packet;

converting contents of the first packet into a corresponding digital representation for feature extraction;

extracting one or more features from the corresponding digital representation; and applying a trained machine learning model to the one or more features to determine probability of maliciousness.

12. The method of claim 11, wherein the steps further include labeling the file based on the probability of maliciousness.

13. The method of claim 11, wherein the steps further include responsive to the first packet having the probability of maliciousness as benign, receiving a next packet of the one or more packets; and performing the converting, extracting, and applying on the next packet.

14. The method of claim 13, wherein the steps further include continuing with additional packets of the one or more packets until a determination of whether the file is malicious or benign.

15. The method of claim 11, wherein the file type is one of a portable executable (PE) file, a portable document format (PDF) file, a Dynamic Loaded Library (DLL), a JavaScript (JS) file, a Hypertext Markup Language (HTML) file, and a Microsoft Office File.

16. The method of claim 11, wherein the digital representation is any of a decimal representation, a binary representation, a hexadecimal representation, a tokenized script, and a tokenized domain.

17. The method of claim 11, wherein the trained machine learning model comprises one or more decision trees.

18. The method of claim 11, wherein the one or more features include n-gram features.

19. The method of claim 11, wherein the one or more features include an entropy feature.

20. The method of claim 11, wherein the one or more features include a domain feature.

* * * * *